United States Patent [19]
Talley

[11] Patent Number: 6,033,704
[45] Date of Patent: Mar. 7, 2000

[54] METHOD AND APPARATUS FOR PRESERVING FRUITS AND VEGETABLES

[75] Inventor: Charles B. Talley, Highlands Ranch, Colo.

[73] Assignee: Charvid Limited Liability Co., Commerce City, Colo.

[21] Appl. No.: 09/134,655

[22] Filed: Aug. 14, 1998

[51] Int. Cl.⁷ .............................. A23B 7/144; A23B 7/152
[52] U.S. Cl. ..................... 426/320; 426/331; 426/335; 426/442
[58] Field of Search ................................ 426/331, 335, 426/312, 320, 442, 474, 532; 422/28–32, 40

[56] References Cited

U.S. PATENT DOCUMENTS

| | | | |
|---|---|---|---|
| 4,421,774 | 12/1983 | Vidal et al. | 426/319 |
| 4,863,688 | 9/1989 | Schmidt et al. | 422/28 |
| 5,273,769 | 12/1993 | Lajoie et al. | 426/319 |

OTHER PUBLICATIONS

Roy Bouns; "Purogne used in Storages 3 & 5"; Jul. 24, 1978; pp. 1–3.

*Primary Examiner*—Keith Hendricks
*Attorney, Agent, or Firm*—Sheridan Ross P.C.

[57] ABSTRACT

The apparatus and method of the present invention is directed to storing and/or preserving fruits and vegetables by introducing an antimicrobial agent and/or additional molecular oxygen into an oxygen-containing gas stream that is circulated through a bed of the fruits and/or vegetables. The antimicrobial agent can be introduced by any number of devices, including for example an atomizer or a humidifier.

21 Claims, 4 Drawing Sheets

METHOD AND APPARATUS FOR PRESERVING FRUITS AND VEGETABLES

FIELD OF THE INVENTION

The method and apparatus of the present invention relates generally to killing microbes that destroy fruits and vegetables and specifically to a method and apparatus for contacting stored fruits and vegetables with an antimicrobial agent.

BACKGROUND

After potatoes are harvested, they are stored in large underground sheds. The sheds are aerated by fans in an attempt to inhibit microbial infection of the stored potatoes and to permit the potatoes to "heal" by growing a new outer protective skin over injuries to the potatoes that occurred during harvesting.

Notwithstanding these protective measures, in the United States alone more than half of the potatoes in storage are lost or damaged due to a number of diseases including late blight, silver scurf, fusarium and other dry rots, soft rots, ring rot, pink eye, Rhizoctonia, and early blight. These diseases collectively account for about $100 million in lost potato sales in the U.S. each year. Internationally, these losses are considerably greater.

There have been many attempts to control one or more of the above microbes. Generally, these attempts involved spraying an antimicrobial agent, such as thiobenzol, dithane and sodium hypochlorite, and hydrogen peroxide, directly on the potatoes prior to storage or on the top of the bed of the potatoes during storage. These agents were not only largely ineffective in controlling the growth of injurious microbes on the stored potatoes but also were potentially damaging to the potatoes or humans. Often, later rinsing steps were required to remove such agents, thereby increasing handling costs.

There is a need for a process and apparatus for controlling and inhibiting the growth of microbes on fruits and vegetables, such as potatoes, during storage.

There is a related need for a process and apparatus for controlling and inhibiting the growth of microbes on fruits and vegetables such as potatoes that does not employ toxic substances. More specifically, the process and apparatus does not employ substances that are toxic to humans or that otherwise damage the fruit or vegetable.

SUMMARY OF THE INVENTION

The present invention provides a simple and inexpensive apparatus and method for storing and preserving fruits and vegetables, such as carrots, onions, apples, and potatoes. The apparatus and method are particularly effective in storing and preserving potatoes. The apparatus is effective in controlling the growth of a variety of microbes, whether bacterial or fungal in nature, including late blight, silver scurf, fusarium and other dry rots, soft rots, ring rot, pink eye, Rhizoctonia, and early blight.

The apparatus includes the following:

(a) an enclosed structure for containing the fruits and/or vegetables;

(b) a plurality of conduits that extend into an area that contains the stored fruits and/or vegetables and that transport and release an oxygen-containing gas;

(c) an air circulation device (e.g., a fan) in communication with the plurality of conduits to provide for circulation of the oxygen-containing gas through the plurality of conduits; and (d) means for introducing the antimicrobial agent into the oxygen-containing gas before the gas is released into the fruits and/or vegetables. Typically, the conduits extend into and through the stored fruits and/or vegetables so that the fruits and/or vegetables are fluidized with the gas.

The means for introducing the antimicrobial agent can be any suitable device for introducing chemical additives to a gas stream. Exemplary devices include a spray or atomizing device for injecting droplets into the gas, a heated surface for vaporizing the antimicrobial agent, a permeable liquid-contacting surface through which the gas passes, drip emitters for introducing droplets into the gas, compressed air foggers, a spinning wheel to create a mist, and the like.

By entraining droplets of the antimicrobial agent in or introducing vapor phase antimicrobial agent into the gas, the contacting device is able to cause distribution of the antimicrobial agent substantially uniformly throughout the pile of fruits and/or vegetables. As will be appreciated, the bed is both highly porous and permeable to the gas. In this manner, it is believed that the antimicrobial agent is contacted with the fruits and vegetables substantially uniformly throughout the bed which effectively kills or retards the growth of microbes.

While not wishing to be bound by any theory, it is believed that the humidity of the gas acts as a vehicle to transport the antimicrobial agent into the fruit or vegetable. The agents attack on the microbes occurs through the natural capillary action in the fruits and vegetables. As will be appreciated, fruits and vegetables are living organisms that absorb water through capillaries extending from the surface to the interior of the fruits and vegetables. As the fruit or vegetable absorbs condensed water from the humidity in the gas through capillary action, the agent is also absorbed by the fruit or vegetable. For effective absorption of the antimicrobial agent to occur through capillary action, it is preferred that the humidity of the gas be maintained from about 85% or higher, more preferably between about 85 to about 99%, and most preferably from about 88 to about 95% and the gas velocity (or wind velocity) be maintained from about 10 CFM, more preferably between about 10 to about 25 CFM, and most preferably between about 15 to about 20 CFM.

The antimicrobial agent can be any suitable substance that is capable of killing or retarding the growth of microbes. The agent is preferably inert with respect to the fruits and/or vegetables and safe for human consumption. Preferred agents include chlorine dioxide, sodium or calcium hypochlorite, hydrogen peroxide, sodium chlorite and mixtures thereof.

The concentration of the antimicrobial agent in the gas is preferably at least about 25 ppm and more preferably ranges from about 120 to about 200 ppm. After introduction of the antimicrobial agent into the gas, the ppm concentration of the agent is adjusted by controlling the gas or wind velocity.

The apparatus offers a number of benefits relative to existing fruit and vegetable storage facilities. The apparatus is not only simple and inexpensive but also highly effective in controlling the growth of microbes in the aerated pile of fruits and vegetables. The gas carries the antimicrobial agent substantially throughout the pile, which is highly porous and permeable to gas flow. The apparatus thus avoids a problem noted in prior art storage facilities in which disease carrying gases are recirculated continuously through the pile, thereby facilitating the spread of the disease to other areas of the pile. The apparatus of the present invention effectively controls the growth of all known spoilage organisms commonly found in the industry. The apparatus permits the application of a broad variety of antimicrobial agents that are fit for human consumption and that were heretofore ineffective in controlling the growth of microbes in stored fruits and vegetables.

The apparatus can include a humidity control device, such as a hydroscreen, to control the humidity of the gas prior to introduction into the fruit and vegetable pile. The humidity control device preferably uses water that has been contacted with the agent to prevent the introduction of microbes into the pile via the water when contacted with the gas stream.

To accelerate the healing process in the some fruits and vegetables such as potatoes, the apparatus can include a molecular oxygen source in contact with the gas to introduce additional molecular oxygen into the gas. In this manner, the gas, which is typically air, is enriched with molecular oxygen relative to the air itself. In other words, the gas preferably contains an amount of molecular oxygen that is greater than that in the air and more preferably contains at least about 22% molecular oxygen by volume. It has been discovered that prior art potato storage sheds have employed circulating gases that contain relatively low concentrations of molecular oxygen which slows or retards the healing process of the potatoes.

The gas is typically recirculated and contacted with fresh air and additional molecular oxygen from the oxygen source. The recirculated gas is again contacted with the antimicrobial agent prior to recirculation through the pile of fruits and/or vegetables.

DETAILED DESCRIPTION

Although the embodiment of the invention depicted in FIGS. 1–4 is directed to potato storage facilities, it is to be expressly understood that the concepts of the present invention apply to other types of fruits and vegetables, including carrots, onions, and apples. Accordingly, the present invention is not to be limited to the preservation of potatoes only.

Figure 1:
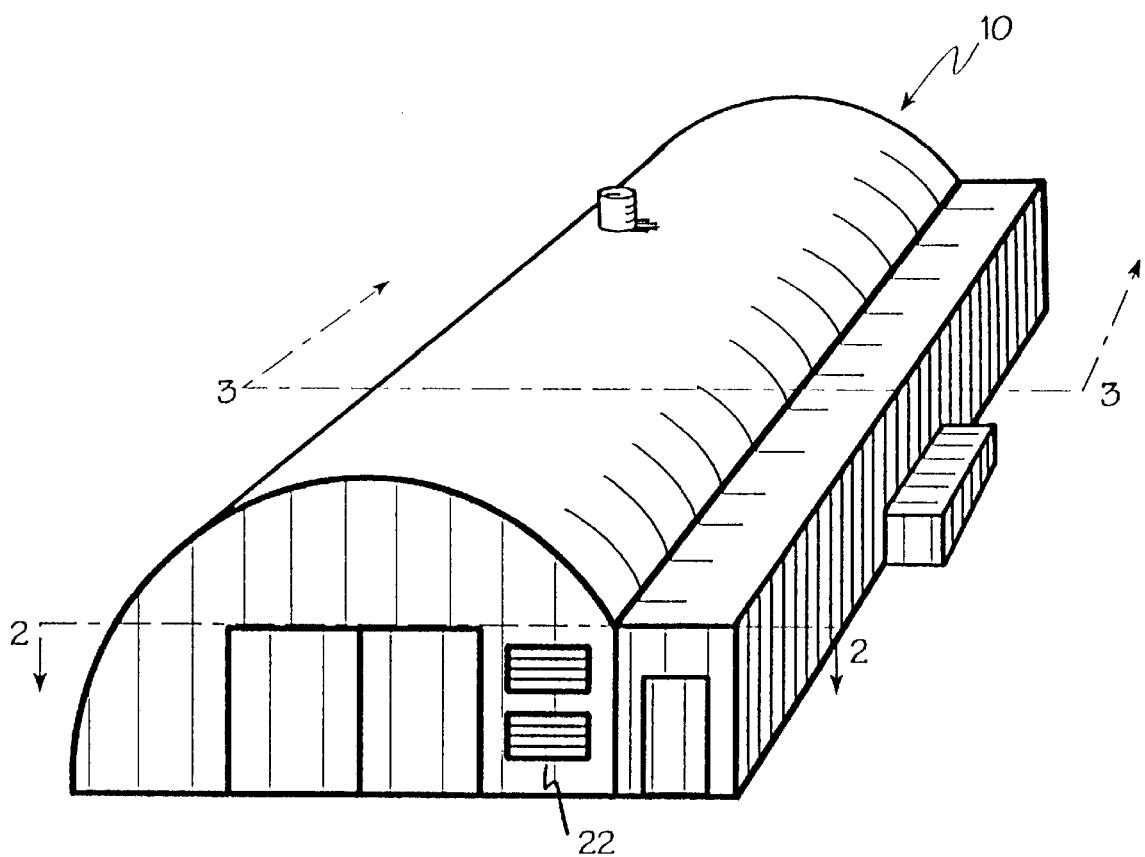
FIG. 1 depicts a potato storage shed according to a first embodiment of the present invention.
Figure 2:
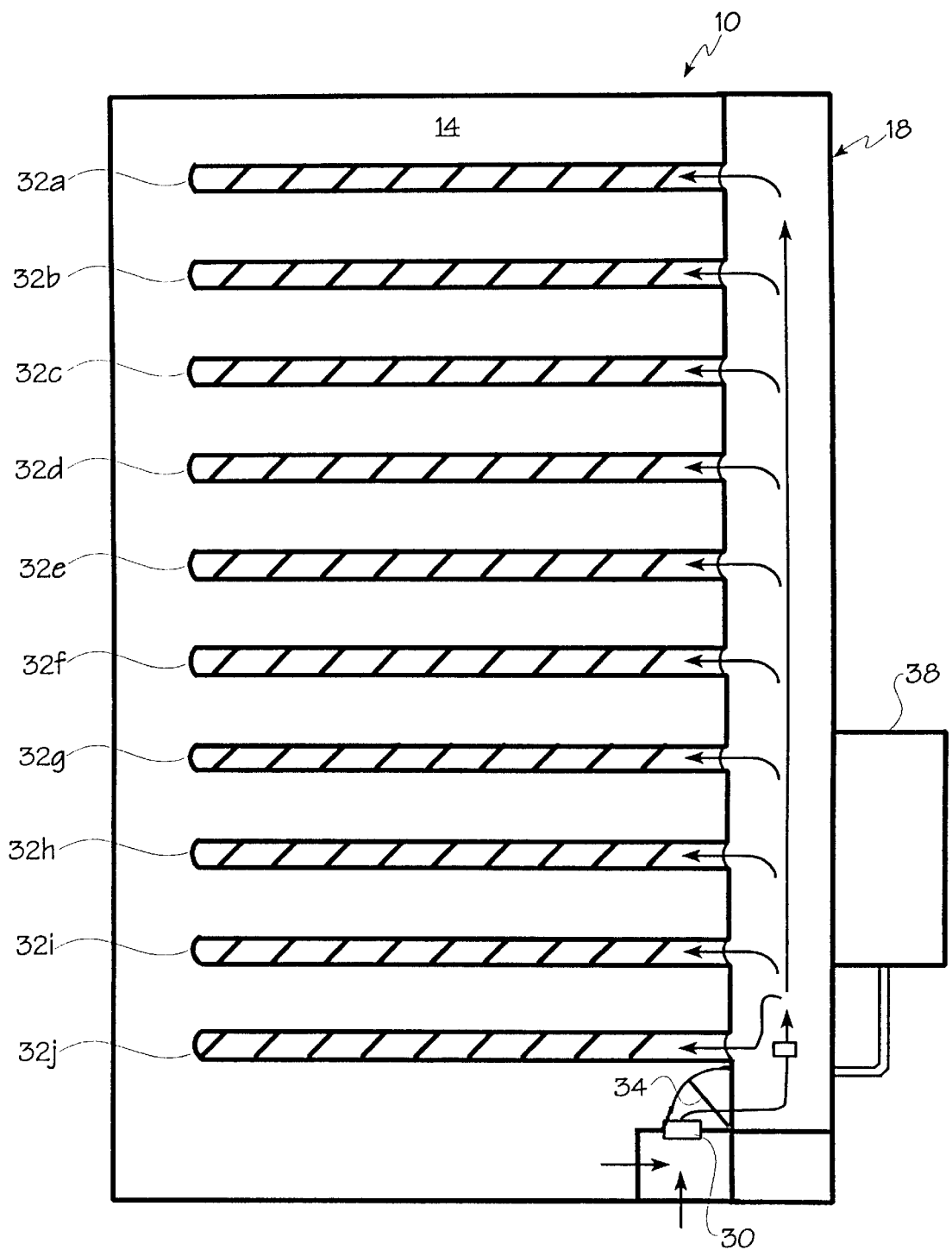
FIG. 2 is a cross-section of the shed taken along line 2—2 of FIG. 1 when the shed is empty.

FIGS. 1 and 2 depict a potato storage shed 10 according to an embodiment of the present invention. The shed 10 includes a potato storage compartment 14 and a gas delivery system 18. The gas delivery system 18 circulates an oxygen-containing gas through the bed of potatoes contained in the potato storage compartment 14. The oxygen-containing gas consists of fresh air and recirculated gas.

Figure 4:
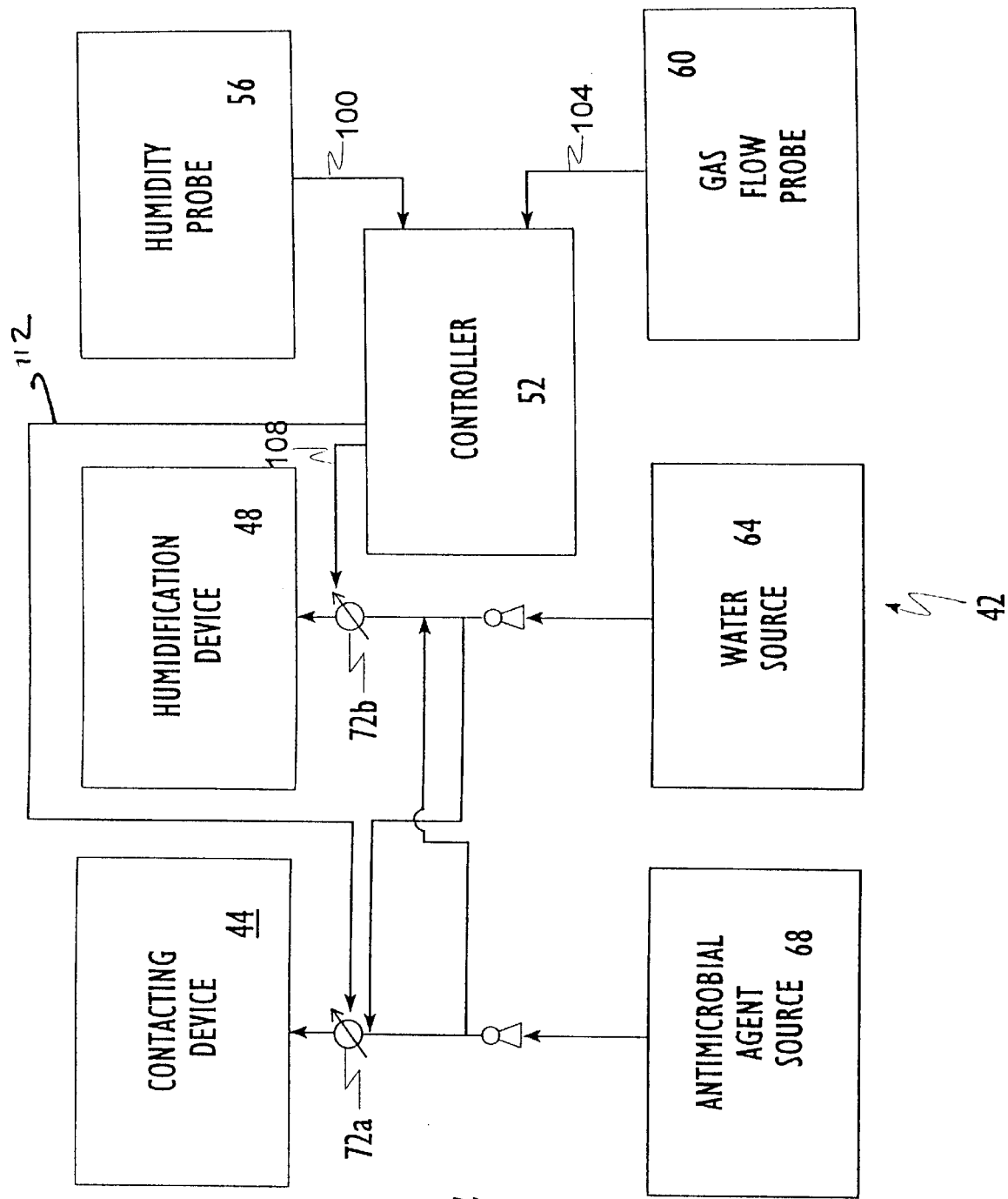
FIG. 4 is a flow schematic of the various elements of the antimicrobial system.

The gas delivery system 18 includes vents 22 to draw in fresh air, a gas passageway 26 in communication with a plurality of conduits 32a–j extending into the potato storage compartment 14, an air circulation device 30 such as a fan, a molecular oxygen source 38, and an antimicrobial agent delivery system 42 (depicted in FIG. 4).

The molecular oxygen source 38 can be any suitable device for generating and/or storing molecular oxygen. A sufficient amount of the molecular oxygen is introduced into the gas stream to provide a molecular oxygen content in the gas that is more than that of the ambient atmosphere (i.e., air), more preferably is at least about 21% by volume and even more preferably ranges from about 22 to about 23% by volume.

Referring to FIG. 4, the antimicrobial agent delivery system 42 includes a contacting device 44 for contacting the antimicrobial agent with the gas, a humidification device 48, a controller 52, a humidity sensor 56, a gas flow sensor 60, a water source 64, and an antimicrobial agent source 68.

The contacting device can be any suitable device that contacts the antimicrobial agent with the gas stream, such as an atomizer, a heated surface, a permeable liquid-contacting surface such as a liquid coated screen, mechanical paddle or spinning wheel, a drip emitter, and the like. Preferred contacting devices include an atomizer (or fogger), mechanical spinning wheel, and the like.

In a particularly preferred embodiment, the antimicrobial agent is sprayed into the gas stream in a plurality of droplets. The droplets preferably have a size of less than about 40 microns and more preferably ranging from about 20 to about 30 microns to permit the droplets to be entrained in the gas and thereby transported to the bed.

The antimicrobial agent can be any substance that is capable of killing one or more of the diseases that damage potatoes. Examples of such diseases include late blight, silver scurf, fusarium and other dry rots, soft rots, ring rot, pink eye, Rhizoctonia, early blight, and numerous other organisms. Preferred antimicrobial agents include chlorine dioxide, sodium chlorite, sodium hypochlorite, calcium chlorite, hydrogen peroxide and mixtures thereof with chlorine dioxide, sodium chlorite, hydrogen peroxide, and mixtures thereof being more preferred.

The antimicrobial agent is introduced into the gas stream preferably as an aqueous solution. The concentration of the antimicrobial agent in the aqueous solution preferably ranges from about 0.03 to about 0.4 and more preferably from about 0.04 to about 0.2 moles of the agent/liter of the solution.

The rate of injection depends of course on the rate of gas flow. Typically, the gas flow ranges from about 0.5 to about 2 acfm and more typically from about 0.75 to about 1.5 acfm. The preferred injection rate for gas flows in this range is at least about 0.5 moles of the agent/minute and more preferably ranges from about 0.75 to about 1.2 moles of the agent/minute. At such injection rates, the volumetric concentration of the antimicrobial agent in the gas typically is at least about 100 ppm and more typically ranges from about 150 to about 200 ppm. Stated another way, the concentration of the droplets containing the antimicrobial agent in the gas typically is at least about 0.01% by volume and more preferably ranges from about 0.015 to about 0.02% by volume.

The humidification device 48 can be any suitable device that increases the humidity of the gas, including a permeable water-contacting surface through which the gas passes such as a hydroscreen or water screen, open pan, swamp cooler, paddle or spinning wheel, and the like. Preferred humidification devices include a hydroscreen or water screen. Because water used in the humidification device can be a source of undesired microbes, it is preferred that such water be contacted with an antimicrobial agent prior to contact of the water with the gas. Preferably, the water contacted with the gas stream contains from about 0.05 to about 0.2 and more preferably from about 0.05 to about 0.15 moles/liter of the antimicrobial agent.

The controller 52 can be any suitable control device that receives a signal from the humidity and/or gas flow sensors and provides control signals to the actuated valves 72a,b to open or close so as to provide more antimicrobial agent solution to the contacting device 44 or humidification device 48 and/or to the air circulation device to vary the gas or wind velocity to provide a desired agent concentration in the gas. A preferred controller is a computer that has internal tables correlating either the measured gas flow or humidity with an amount of solution to be provided to the contacting device 44 or humidification device 48, respectively. The gas flow sensor is generally located upstream of the contacting device 44 and the humidity sensor is generally located upstream of the humidification device 48 to provide an adequate response time for the valves to open in response to the control signal(s) or the wind velocity to be varied.

The water source can be a surface body of water or a subterranean aquifer.

The antimicrobial agent source can be a diluted or undiluted solution of the antimicrobial agent. Preferably, the source is a substantially pure or concentrated aqueous solution that is diluted with water from the water source prior to injection into the gas stream.

Figure 3:
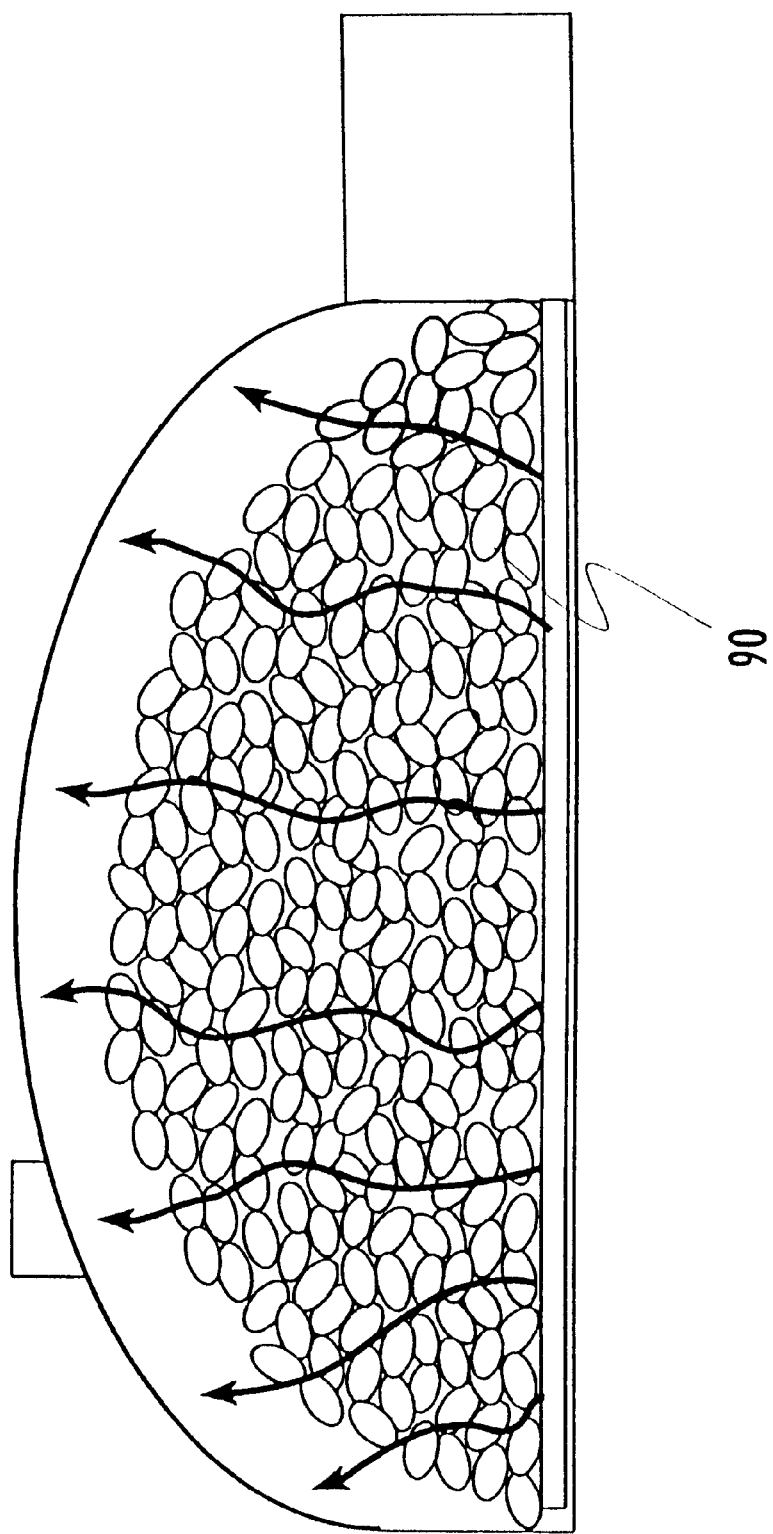
FIG. 3 is a cross-section of the shed taken along line 3—3 when the shed is full of potatoes.

The operation of the above-described apparatus will now be described. After placement of the harvested potatoes in the compartment 14 in the form of a bed or heap of potatoes, the vents 22 are opened to provide a source of fresh air and the air circulation device 30 is actuated to draw fresh air into the shed 10. The air or oxygen containing gas is drawn through the humidification device 48 to adjust the humidity of the gas 34, through the passageway 18, and through the conduits 32a–j which inject the gas into the bottom portion of the potato bed. The gas is drawn through the bed as shown in FIG. 3 and returns to the air circulation device where it is mixed with additional fresh air and the process repeated.

As the gas is circulated through the gas passageway 18 in each successive pass, the gas is contacted with additional molecular oxygen from the molecular oxygen source 38, and the humidity and gas flow measurement probes measure humidity and gas flow, respectively, and provide input signals 100 and 104 that are proportional to the measured humidity and gas flow to the controller 52. In response to the signals, the controller generates control signals 108 and 112 to the actuated valves 72a and b which are either opened or closed in response to the control signals.

If the valve 72b is opened, water is supplied to the humidification device and the humidity of the gas is increased. The antimicrobial agent will be introduced into the gas stream as a vapor along with water vapor.

If the valve 72a is opened, antimicrobial agent is provided to the contacting device 44, which introduces the antimicrobial agent to the gas. This is the primary mechanism by which the antimicrobial agent is introduced into the gas stream.

The valves 72a–b may open and close at different times or at the same time, depending upon the measured humidity and gas flow.

In any event, the gas, which now contains an enriched amount of molecular oxygen and the antimicrobial agent, either as a vapor or liquid droplets or both, is passed through the conduits 32a–j and through the bed 90.

EXPERIMENTAL

Example 1

In a potato storage shed having a 70,000 CWT capacity of seed potatoes, chlorine dioxide was introduced by means of a fogger into the gas stream circulating through the bed. Chlorine dioxide was also added to the water used on the hydroscreen to control humidity in the gas. The potatoes had recently been harvested and put into storage. Soft rot had infected many of the potatoes in storage. After 30 days of implementing this process, the soft rot had not spread to other potatoes in the bed. Throughout the storage season, the pile maintained storage integrity. The total loss due to soft rot throughout the storage season was held to 1%. In previous years, the storage facility had experienced a loss of potatoes due to various diseases ranging from 10 to 15%.

Example 2

In an 80,000 CWT potato storage shed, soft rot was observed in the south end of the shed. At the start of the treatment described in Example 1, a portion of the entire bed was infected with soft rot. This was observed when the potatoes came from the field. In January, the treatment was begun. At this time, 7% of the pile was infected. From January through May, chlorine dioxide was applied weekly. Other than the original 7% that were infected at the beginning of the pretreatment period, no more potatoes were lost.

Example 3

In a 65,000 CWT storage shed, stored potatoes exhibited silver scurf and soft rot activity. They were treated with the process of Example 1 at the beginning of storage. Using this treatment process throughout six months of storage, there was no additional bacteria or fungal activity noted.

While various embodiments of the present invention have been described in detail, it is apparent that modifications and adaptations of those embodiments will occur to those skilled in the art. However, it is to be expressly understood that such modifications and adaptations are within the scope of the present invention, as set forth in the following claims.

I claim:

1. A method for deterring spoilage of fruits or vegetables, comprising:

(a) providing a gas stream containing an antimicrobial agent selected from the group consisting of chlorine dioxide, sodium chlorite, hydrogen peroxide, sodium hypochlorite, calcium hypochlorite, calcium chlorite and mixtures thereof;

(b) contacting the gas stream with a water source to alter the humidity of the gas stream;

(c) contacting the gas stream with a pressurizing device to control the wind velocity of the gas stream; and (e) passing the gas stream the antimicrobial agent and water through a bed of fruits or vegetables.

2. The method of claim 1, wherein the antimicrobial agent is selected from the group consisting of chlorine dioxide, sodium chlorite, hydrogen peroxide, and mixtures thereof.

3. The method of claim 1, wherein the providing step includes the step of injecting a plurality of liquid droplets containing the antimicrobial agent into the gas stream.

4. The method of claim 3, wherein the rate of injection of the antimicrobial agent ranges from about 0.75 to about 1.2 moles/minute.

5. The method of claim 1, wherein the gas stream contains at least about 100 ppm of the antimicrobial agent.

6. The method of claim 3, wherein the liquid comprises from about 0.03 to about 0.4 moles of antimicrobial agent/liter of liquid.

7. The method of claim 1, wherein the contacting step (b) includes the step of passing the gas stream through a permeable surface containing water, the water also containing an antimicrobial agent.

8. The method of claim 7, wherein the concentration of the antimicrobial agent in the water ranges from about 0.05 to about 0.2 moles/liter.

9. The method of claim 1, further comprising, after the passing step, combining the gas stream with additional molecular oxygen and recirculating the the gas stream through the bed wherein the oxygen content of the gas stream after the combining step is at least about 22% by volume.

10. The method of claim 1, wherein the humidity of the gas stream is at least about 85%.

11. The method of claim 1, wherein the humidity of the gas stream is maintained substantially constant during the passing step.

12. The method of claim 1, wherein the gas stream has a wind velocity ranging from about 10 to about 25 CFM.

13. The method of claim 1, wherein the concentration of the antimicrobial agent in the gas stream ranges from about 120 to about 200 ppm.

14. The method of claim 1, wherein in the passing step the gas stream fluidizes the bed.

15. A method for long-term storage of fruits and vegetables in a storage facility, comprising:

(a) providing a plurality of conduits in communication with a bed of a fruit or vegetable;

(b) contacting a gas stream with an antimicrobial agent;

(c) contacting the gas stream with an oxygenated gas having a concentration of oxygen greater than that of air; and (d) passing the gas stream through the plurality of conduits and through the bed to form a depleted gas stream.

16. The method of claim 15, wherein the gas stream includes oxygen in a concentration of at least about 22% by volume.

17. The method of claim 15, further comprising:

(e) maintaining the humidity of the gas stream at or near a predetermined level using a humidity control device.

18. The method of claim 15, further comprising:

(e) injecting a plurality of droplets of a composition comprising the antimicrobial agent into the gas stream to entrain the droplets in the gas stream and thereby transport the droplets into the bed.

19. The method of claim 15, wherein the droplets have a size of less than about 40 microns.

20. A method for long-term storage of fruits and vegetables in a storage facility, comprising:

(a) providing a plurality of conduits in communication with a bed of fruit or vegetables;

(b) contacting a gas stream with an antimicrobial agent selected from the group consisting of chlorine dioxide, sodium chlorite, hydrogen peroxide, sodium hypochlorite, calcium hypochlorite, calcium chlorite and mixtures thereof water, and additional oxygen, wherein the gas stream has a concentration of oxygen greater than that of air and the antimicrobial agent is contained in a plurality of droplets entrained in the gas stream;

(c) passing the gas stream through the plurality of conduits to fluidize the bed and form a depleted gas stream wherein the plurality of droplets contact the fruit or vegetables in the bed; and (d) recycling the depleted gas stream to the contacting step.

21. The method of claim 15, wherein the antimicrobial agent is selected from the group consisting of chlorine dioxide, sodium chlorite, hydrogen peroxide, sodium hypochlorite, calcium hypochlorite, calcium chlorite and mixtures thereof.

* * * * *